United States Patent [19]

Alieri

[11] Patent Number: 5,786,079
[45] Date of Patent: Jul. 28, 1998

[54] APPARATUS FOR MANUFACTURING SCREW CLOSURES BY PRESSURE MOLDING

[75] Inventor: Rodiero Alieri, Imola, Italy

[73] Assignee: Sacmi Cooperativa Meccanici Imola S.c.r.l., Imola, Italy

[21] Appl. No.: 646,323

[22] PCT Filed: Sep. 15, 1995

[86] PCT No.: PCT/EP95/03644

§ 371 Date: May 13, 1996

§ 102(e) Date: May 13, 1996

[87] PCT Pub. No.: WO96/09153

PCT Pub. Date: Mar. 28, 1996

[30] Foreign Application Priority Data

Sep. 19, 1994 [IT] Italy ................ BO94A0410

[51] Int. Cl.⁶ ................ B29C 43/08; B29C 43/42
[52] U.S. Cl. ................ 425/349; 425/407; 425/422; 425/423; 425/438; 425/809
[58] Field of Search ................ 425/422, 423, 425/349, 809, 438, 454, 457, 437, 407

[56] References Cited

U.S. PATENT DOCUMENTS

| | | |
|---|---|---|
| 2,440,366 | 4/1948 | Cropp ................ 425/423 |
| 2,891,281 | 6/1959 | Heinzelman ................ 425/348 R |
| 4,640,673 | 2/1987 | Takeda et al. ................ 425/297 |
| 4,776,782 | 10/1988 | Murayama et al. ................ 425/809 |
| 4,819,906 | 4/1989 | Cochrane ................ 425/577 |
| 5,451,360 | 9/1995 | Ingram ................ 425/809 |
| 5,554,327 | 9/1996 | Ingram et al. ................ 425/809 |

FOREIGN PATENT DOCUMENTS

| | | |
|---|---|---|
| 0 026 405 | 4/1981 | European Pat. Off. . |
| 0 073 334 | 3/1983 | European Pat. Off. . |
| 0 091 653 | 10/1983 | European Pat. Off. . |
| 0162456 | 11/1985 | European Pat. Off. . |
| 0207385 | 1/1987 | European Pat. Off. . |
| 0654335 | 5/1995 | European Pat. Off. . |
| 842266 | 6/1952 | Germany . |
| 2007777 | 9/1971 | Germany . |
| 1224172 | 4/1986 | U.S.S.R. ................ 425/438 |
| 95/32086 | 11/1995 | WIPO . |

*Primary Examiner*—Robert Davis
*Attorney, Agent, or Firm*—Guido Modiano; Albert Josif

[57] ABSTRACT

Apparatus for manufacturing items made of plastics, particularly screw caps, by pressure molding, which includes a carousel on which molding units are arranged, each molding unit comprising an upper plunger against which a half-mold is hydraulically pushed. The half-mold defines a cavity inside which a dose of plastics has been introduced. Separation elements for extracting the cap after its manufacture are associated with the plunger.

13 Claims, 8 Drawing Sheets

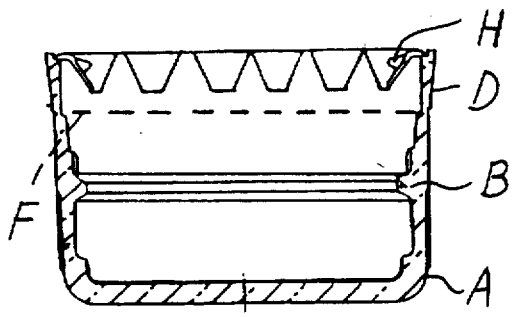
FIG. 8
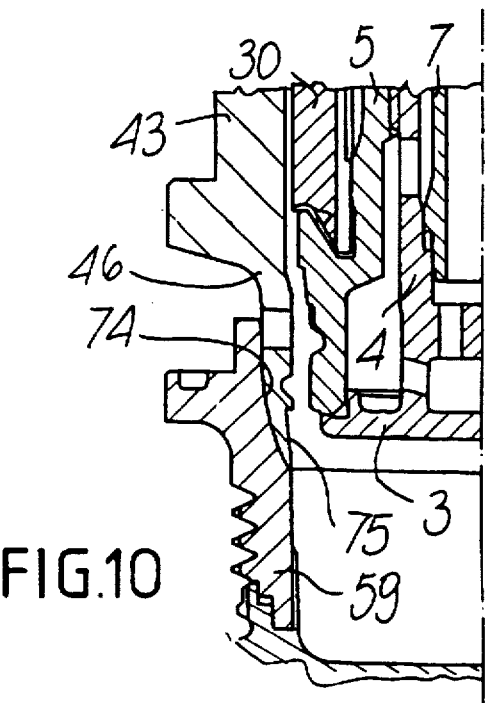
FIG.10
FIG.9
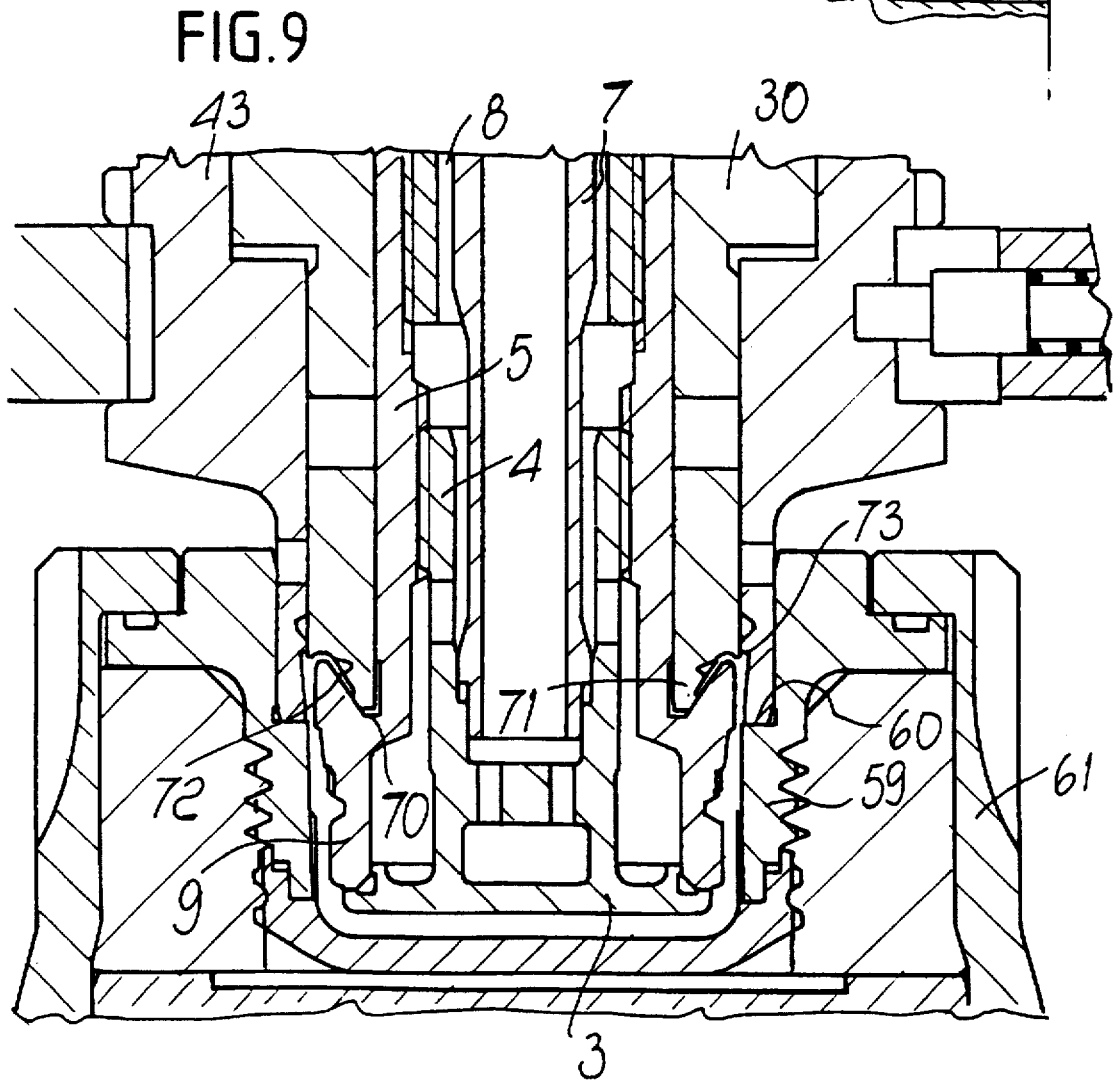

APPARATUS FOR MANUFACTURING SCREW CLOSURES BY PRESSURE MOLDING

BACKGROUND OF THE INVENTION

The present invention relates to an apparatus for manufacturing items made of plastics, particularly screw closures, by pressure molding.

Methods and devices for the pressure molding of closures constituted by a cup to be applied by screwing (screw caps) or by pressure (crown caps) on the mouth of containers are already known, for example from German publication no. 2,007,777, from European publication no. 162,456, and from U.S. Pat. Nos. 2,155,316, 2,891,281, 4,343,754, and 4,497,765.

Conventional devices comprise a carousel that can rotate about a vertical axis and on which a plurality of molding units, mutually spaced by the same angle, are mounted. Each unit comprises an upper male half-mold that is aligned with a lower female half-mold. A dose of semi-fluid plastic material is introduced in the female half-mold and is pressed by means of a relative motion of the two half-molds. In U.S. prior Pat. No. 2,155,316 and U.S. Pat. No. 2,891,281 (hereinafter referenced as prior patents X), the relative motion is produced by the hydraulic lifting of the female half-mold, whereas in the other prior patents (hereinafter termed prior patents Y) it is the male half-mold that is forced against the female half-mold by virtue of a mechanical movement produced by cam means.

In the devices disclosed in prior patents X it is not possible to produce screw closures provided with a tamper-proof ring. On the other hand, in the devices disclosed in prior patents Y, in order to allow the formation of the tamper-proof ring, the male half-mold has a composite structure, in which the elements must be movable in order to be able to transmit the molding pressure and allow to remove the molded closure. Due to this reason, in devices disclosed in prior patents Y, the high stresses that occur during molding require the male half-molds to have a particularly strong structure to neutralize the unavoidable deformations and mechanical tolerances that might compromise their perfect mating with the female half-molds. Furthermore, actuation elements are required to open the part of the mold that is meant to form the tamper-proof ring. This strong and complex structure, however, makes replacement and calibration of the half-molds very difficult, especially when it is necessary to replace said half-molds to manufacture closures having a different shape.

SUMMARY OF THE INVENTION

The principal aim of the present invention is to provide an apparatus for producing screw caps with a tamper-proof ring, in which the pressing effect is assigned to the female half-mold, as in prior patents X, but the male half-mold is structured so as to allow to form the tamper-proof ring as in prior patents Y.

Within the scope of this aim, an object of the present invention is to provide an apparatus in which the half-molds can be easily replaced in relation to the characteristics of the closures to be manufactured.

This aim and this object are achieved with an apparatus whose characteristics are defined in the appended claims.

BRIEF DESCRIPTION OF THE DRAWINGS

Further particularities of the present invention will become apparent from the following description of a preferred embodiment and of some variations, illustrated only by way of non-limitative example in the accompanying drawings, wherein:

FIG. 8 is a sectional view of another type of closure;

FIG. 9 is a view of another embodiment of the mold for manufacturing the closure of FIG. 8;

FIG. 10 is a view of a further embodiment of the mold;

DESCRIPTION OF THE PREFERRED EMBODIMENTS

Figure 1:
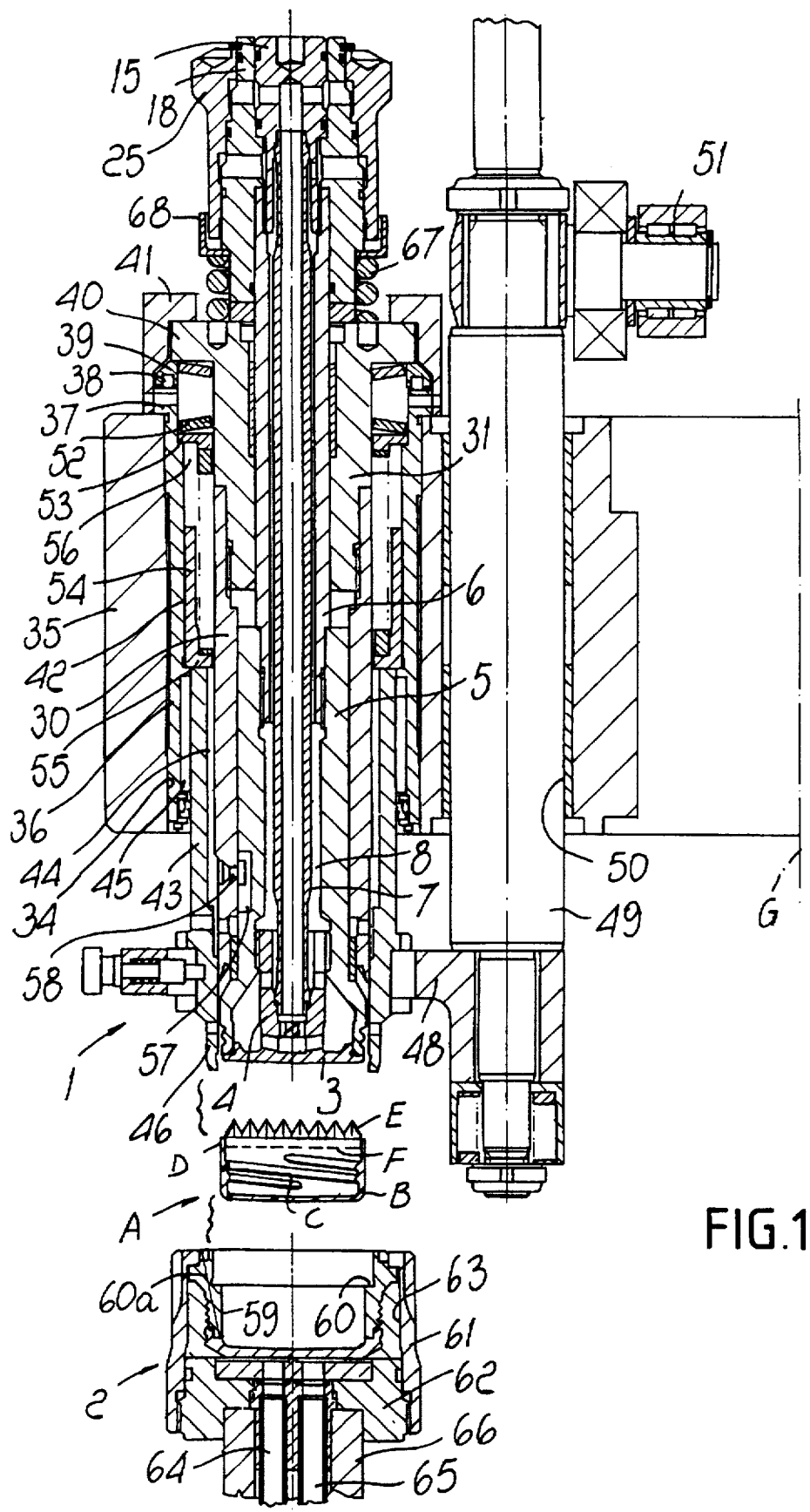
FIG. 1 is a sectional elevation view of a molding unit, taken along a vertical plane, for forming a closure with a tamper-proof ring.
Figure 2:
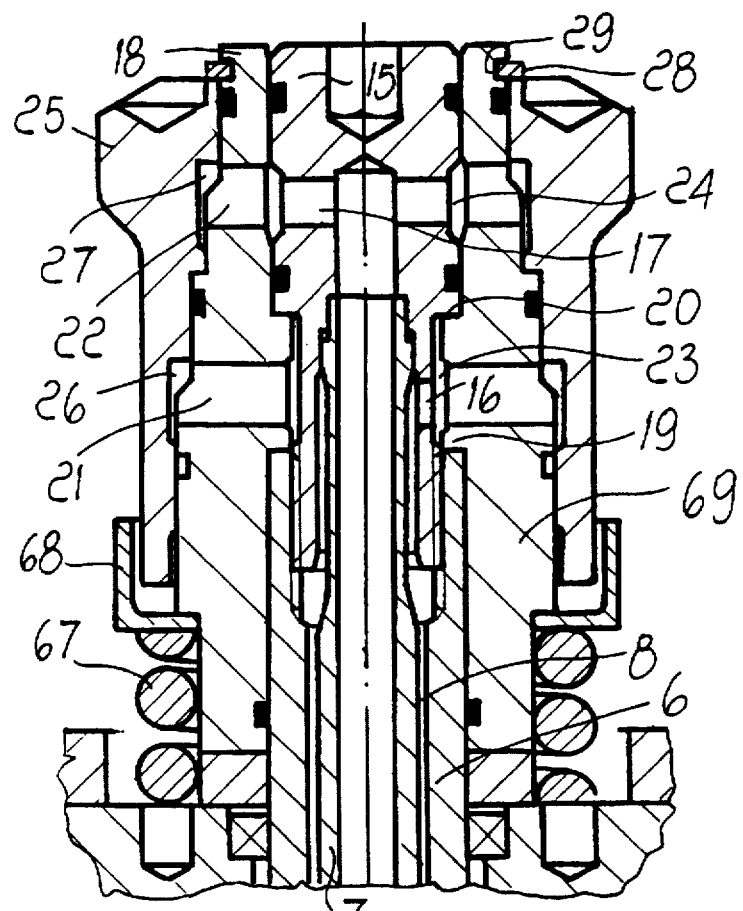
FIGS. 2 and 3 are two enlarged-scale views of details of FIG. 1.
Figure 3:
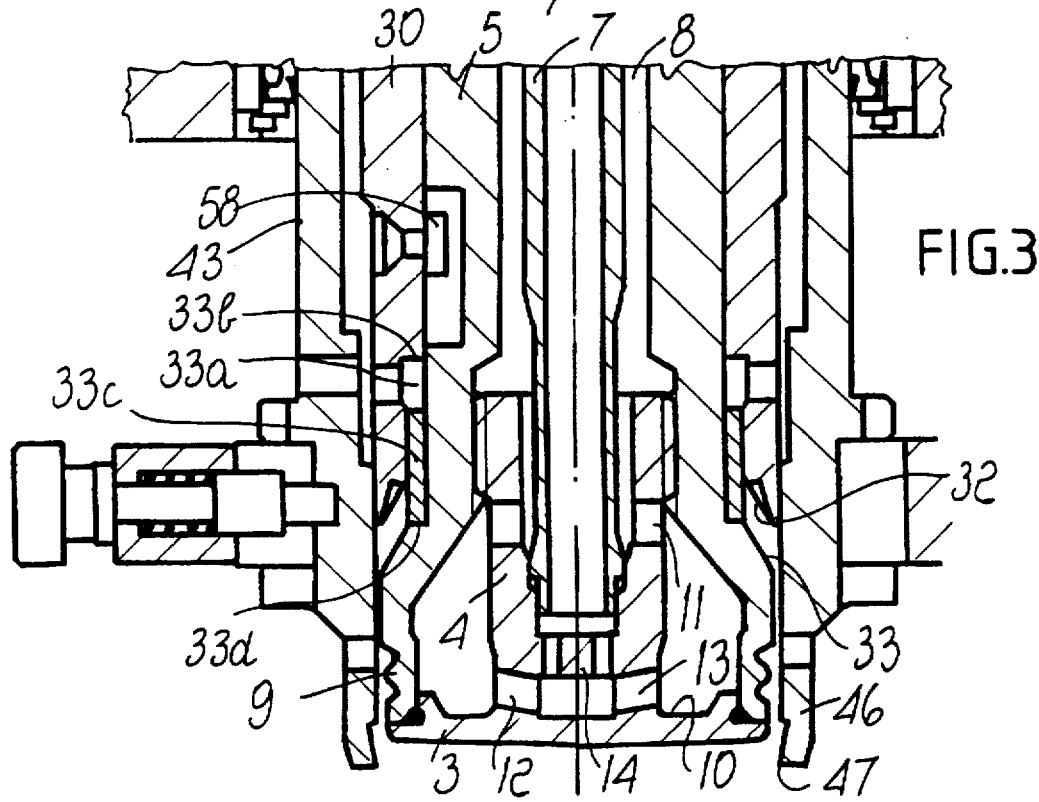

With reference to FIGS. 1–3, the apparatus is composed of a carousel that can rotate about a vertical axis and supports, in its peripheral region, a plurality of units for molding closures made of plastics. Hereinafter, it is assumed that said closures are of the screw type with a tamper-proof ring that is adapted to clearly indicate tampering of the containers to which the closures are to be applied.

Each unit is composed of an upper male half-mold, generally designated by the reference numeral 1, and of a lower female half-mold, generally designated by the reference numeral 2.

The half-mold 1 comprises a pan 3 which is screwed into a vertical sleeve 5 by means of a tubular tang 4 of said pan; the sleeve is in turn screwed on a tubular stem 6.

A tube 7 is hermetically inserted in the tubular tang 4 and, together with the tubular stem 6 and the sleeve 5, forms a cylindrical interspace 8. The sleeve 5 has, at its lower end, a wider portion 9 that is hermetically centered on the pan 3 and forms, together with the tubular tang 4, a chamber 10 that is connected to the interspace 8 through openings 11 of the tubular portion. The chamber 10 is connected to the inside of the tube 7 by means of openings 12 and 13 formed in the region of the tubular tang 4 directly above the pan 3 and respectively in a diaphragm 14 of said tang.

The portion 9 of the sleeve 5 and the pan 3 form the plunger, which produces the internal ridges of the closure; in the illustrated example, said closure is constituted by a cap A composed of a cylindrical cup B that is provided with an internal thread C and with a tamper-proof ring D that comprises a retention element constituted by a ring E that is folded along radial planes. The ring E tapers inward, forming an obtuse angle with the cylindrical wall of the cup B. In a separate production step, the tamper-proof ring D, is made detachable from the cup B by a perimetric score line F that allows it to separate when the cap is unscrewed from the container to which it has been applied. It should be noted that before putting the cap on the container, the retention ring E is folded towards the inside the cup B so as to form an acute angle with the internal wall of said cap and so that it can engage, during application on the container, a collar or other undercut that is formed on the neck of the container directly below the cap screwing region.

The upper end of the tube 7 is hermetically inserted in a seat of an externally threaded cylindrical plug 15 in which radial openings 16 and 17 are formed at different levels. The plug 15 is screwed into the upper end of the tubular stem 6, so that the tube 7 is locked between the plug 15 and the portion 4.

The plug 15 is hermetically accommodated in a sleeve 18, in the lower part of which the top of the tubular stem 6 is inserted. The sleeve 18 has an internal collar 19, which remains clamped between a shoulder 20 of the plug 15 and the upper edge of the stem 6, so that the sleeve 18 is also rigidly coupled to the stem 6 and follows its axial movements.

Radial openings 21 and 22 are formed in the sleeve 18 and are connected respectively to the openings 16 and 17 of the plug 15 by means of annular grooves 23 and 24 that are formed between the plug 15 and the sleeve 18. A bush 25 is hermetically superimposed on the sleeve 18, and two grooves 26 and 27 are formed inside said bush; the first groove mutually connects the openings 21 and the second groove mutually connects the openings 22. By means of connectors (not shown in the drawing) applied to the bush 25, the grooves 26 and 27 are connected to the delivery and to the return of a coolant liquid which, through the tube 7, is conveyed into the chamber 10 to cool the plunger 3, 9 and to harden the plastics of which the cap A is made. The liquid is then made to flow out of the chamber 10 through the openings 11 and the interspace 8 and outside from there through the openings 16 and 21.

The bush 25 is retained axially on the sleeve 18 by an elastic ring 28 that engages an annular groove 29 of the sleeve 18.

The sleeve 5 is slidingly guided in a cylindrical jacket 30 that is rigidly coupled to a tubular element 31, in which the stem 6 slides, by means of a screw coupling.

The lower edge of the jacket 30 is internally provided with a conical chamfer 32 that is arranged axially opposite 1 to a collar 33, by means of which the portion 9 is connected to the sleeve 5. The collar 33 is provided with a conical surface that is complementary to the surface of the chamfer 32. Inside the jacket 30, proximate to the lower edge, there is a cylindrical seat 33a that forms a shoulder 33b and is closed towards the inside by the sleeve 5. The seat 33a accommodates a spacer ring 33c that is superimposed on the sleeve 5 and rests on a step 33d formed at the top of the portion 9. As will become apparent hereinafter, the spacer 33c is sized so as to abut against the shoulder 33b during the molding of the cap, so as to form, between the chamfer 32 and the collar 33, a cavity that is meant to form the retention element E.

The jacket 30 and the element 31 are coaxial to a respective cylindrical seat 34 of a supporting body that is part of the structure of the carousel. In practice, said body is constituted by a sort of rotatable drum 35, which is mounted on a vertical shaft whose axis G is the rotation axis of the carousel.

A bush 36 is inserted in the seat 34 and abuts against the edge of the seat 34 with an annular lip 37. A spacer ring 39 rests on the annular ring 37 with the interposition of an elastic ring 38; the tubular element 31 in turn rests on said spacer ring 39 by means of an external flange 40 of said tubular element 31. A retention element 41 engages on the flange 40 by means of screws (not shown in the drawing) and locks the element 31 and the bush 36, coaxially to each other and to the seat 34, on the upper face of the drum 35.

A cylindrical chamber 42 is formed between the bush 36 and the outer surface of the jacket 30 and of the element 31; a sleeve 43 extends inside said chamber from below and is guided axially on the jacket 30 by an internal bearing 44 and by an external bearing 45 in the bush 36.

The sleeve 43, at the level of the portion 9, ends with an annular segment or ring 46, whose inner edge is designated by the reference numeral 47. The ring 46 forms an interspace with the outer surface of the portion 9 for the molding of the ring D and of the cylindrical wall of the cup B.

The sleeve 43, by means of an arm 48, is rigidly connected to a post or stem 49 that is parallel thereto. The post 49 is guided in a seat 50 of the drum 35 and is provided, at the top, with a roller 51 that follows a circular cam that is rigidly coupled to the fixed structure of the apparatus and is therefore stationary and lies concentrically to the rotation axis G of the carousel. The cam (not shown in the drawing) positively actuates the movements of the sleeve 43 in a downward direction only over an angle that is sufficient to remove the closure formed by the plunger 3, 9; over the remaining angle of rotation, the sleeve 43 can move upward in contrast with elastic abutment means.

Said means are constituted by a plurality of Belleville springs 52 that are interposed between the flange 40 of the tubular element 31 and a swivel ring 53 that rests on a tubular case 54 that is accommodated in the chamber 42. The case 54 has an internal lip 55 on which a cylindrical spring 56, adapted to act against the swivel ring 53, rests.

In order to prevent the sleeve 5 from rotating with respect to the jacket 30, on the outside of the sleeve 5 there is an axial slot 57 in which a roller 58 slidingly engages; said roller 58 protrudes towards the inside of the jacket 30.

The lower half-mold 2 is composed of a bowl 59 that forms a cavity that allows to insert the ring 46 until it abuts against a shoulder 60 and closes the cap molding chamber. Holes 60a are formed in the wall of the bowl 59 and keep the cavity of the bowl connected to the outside to allow venting of the air that, during molding, has remained trapped in the mold.

By means of an external ring 61, the bowl 59 is locked against a disk 62 and together they form a chamber 63 that is connected to a feed duct 64 and to a discharge duct 65 for a cooling liquid.

The ducts 64 and 65 run inside a hollow stem 66, on which the disk 62 is mounted. The hollow stem is guided in the structure of the apparatus coaxially to the plunger 3, 9 and is actuated by a respective hydraulic actuator so as to move the bowl 59 toward and away from the plunger 3, 9.

The operation of the described apparatus is as follows.

Figure 4:
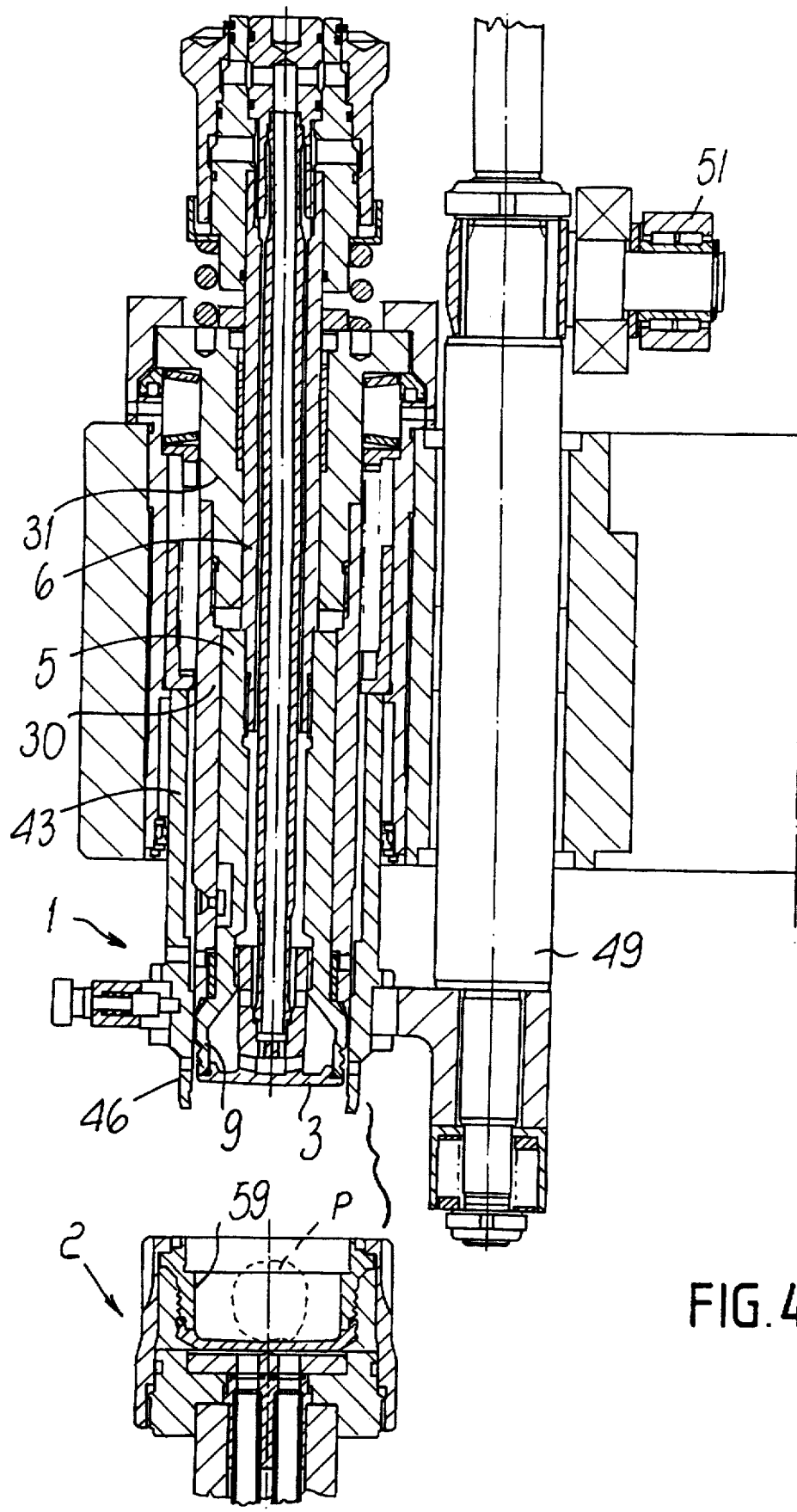
FIGS. 4, 5, 6, and 7 are views of further operating situations of the apparatus.

During the rotation of the carousel, a dose P of pasty plastics is deposited in the cavity of the bowl 59. During this step, shown in FIG. 4, the bowl 59 is lowered with respect to the plunger 3, 9 which, by means of return elastic means, is actuated into the position in which it stops against the lower end of the jacket 30. In the illustrated example, the elastic means are constituted by a spring 67 that is interposed between the flange 40 and a thrust washer 68 that rests on an annular abutment 69 of the sleeve 18 and has an edge that is folded upward so as to enclose the base of the bush 25. The stationary cam that controls the stroke of the stem 49 and therefore of the sleeve 43 is adjusted so that during this step the edge 47 of the ring 46 is at a lower level than the pan 3 of the plunger.

When the female half-mold 2 is raised hydraulically, the ring 46 abuts against the shoulder 60 and the molding chamber, formed between the plunger 3, 9 and the bowl 59, closes.

Figure 5:
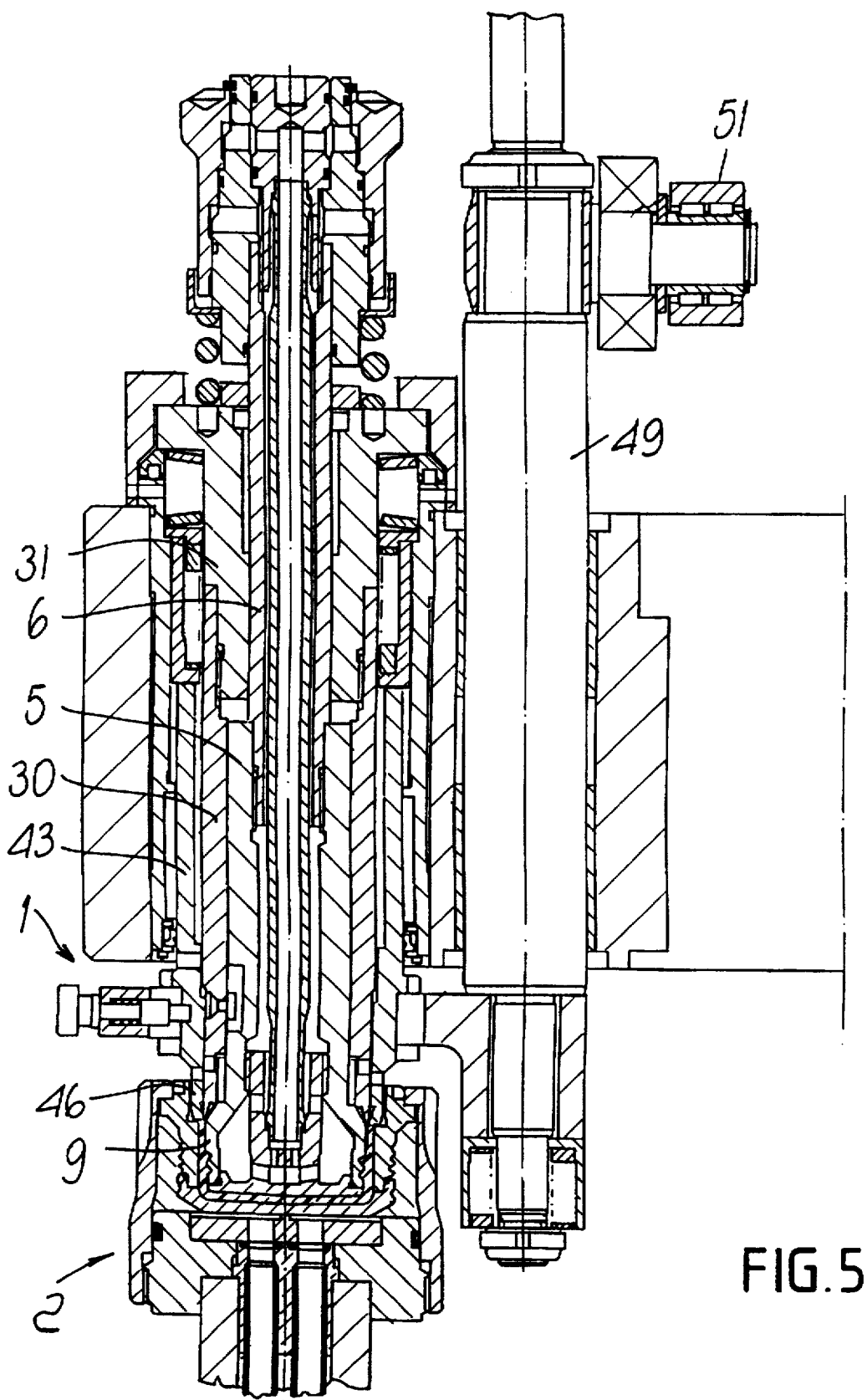

Then the pressure applied to the lower half-mold 2 causes the gradual distribution of the plastics in the molding chamber until it also fills the cavity for the molding of the ring E, which is formed between the chamfer 32 and the collar 33. When the molding cavity has been filled, due to the incompressibility of the plastic material, the bowl 59 stops in the final position shown in FIG. 5. In this position, the edge 47 of the ring 46 is at the level of the angle formed between the conical surface of the collar 33 and the cylindrical surface of the portion 9 and is therefore above the edge of the cup B from which the retention ring E protrudes.

Figure 6:
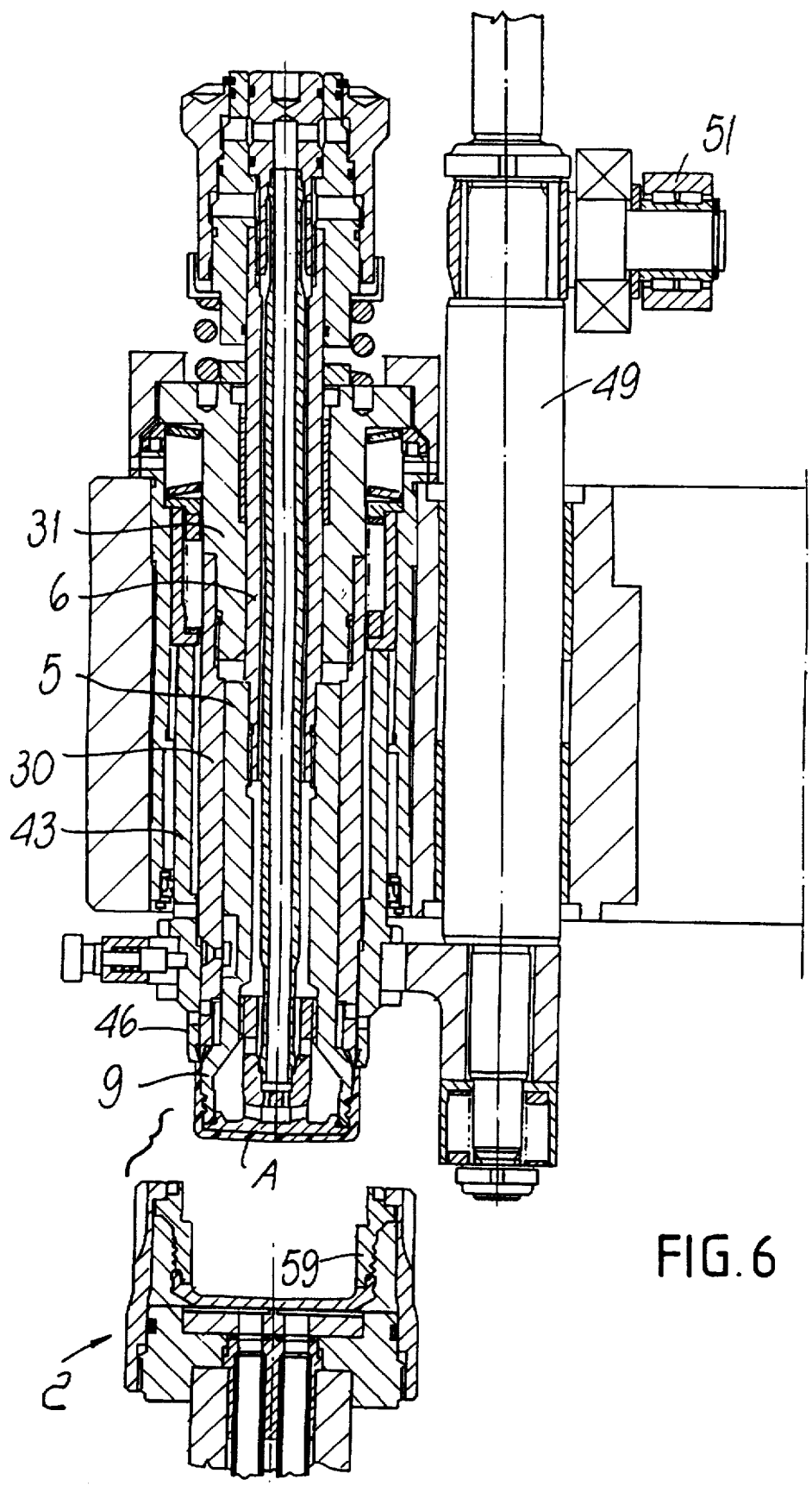
Figure 7:
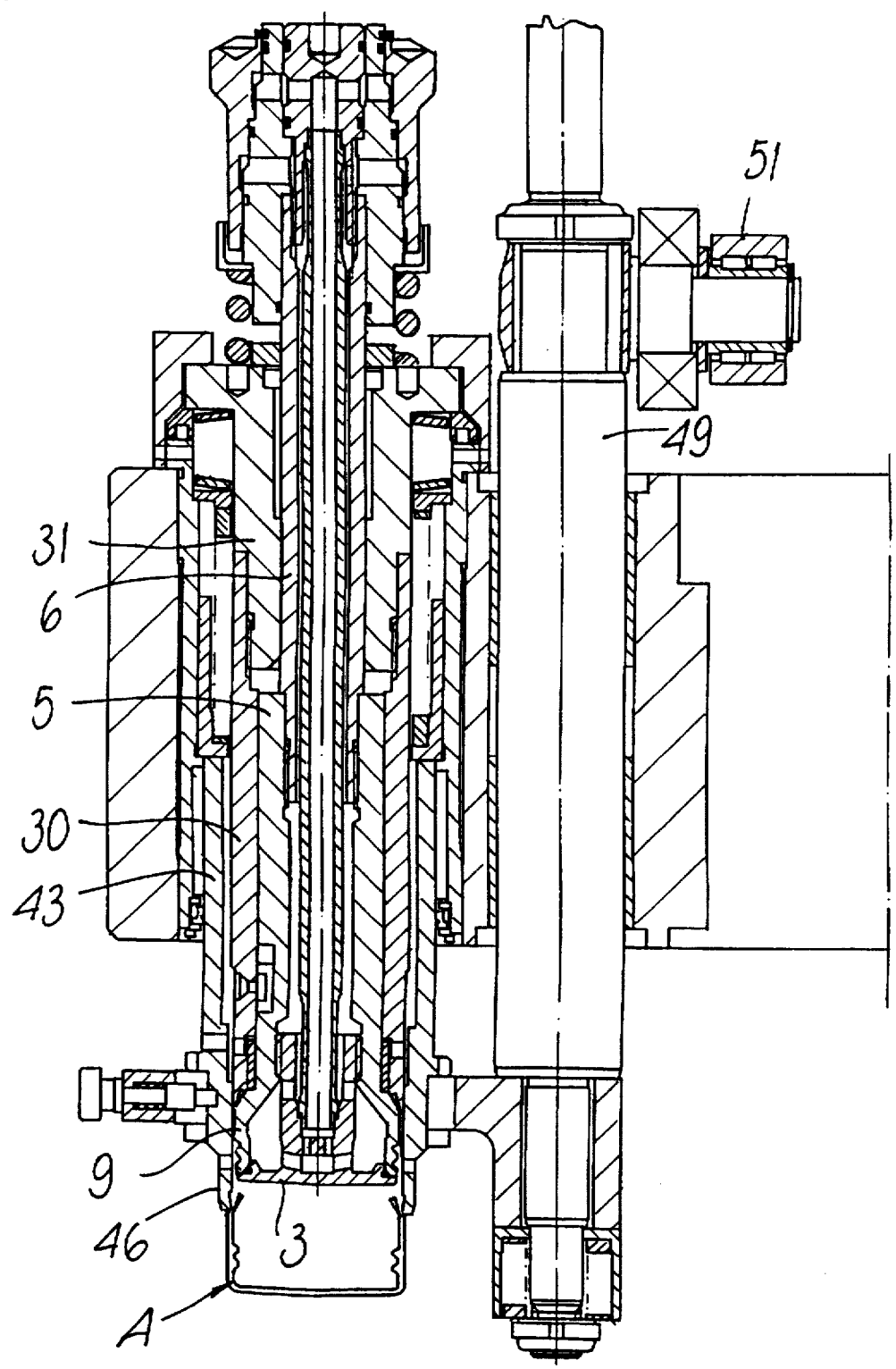

When the plastics has reached an adequate hardening point, caused by the feeding of the coolant liquid into the chambers 10 and 63, so that plastic deformations are no longer to be feared, the descent of the bowl 59 is actuated (see FIG. 6). However, when the bowl 59 is spaced, the cap A does not drop but remains attached only to the plunger 3, 9.

When the bowl 59 has moved away, the descent of the stem 49 is actuated; by dragging the sleeve 43 downward, due to the axial thrust of the edge 47 on the edge of the cap A, said stem causes the separation of the cap from the plunger. The separation of the cap is allowed by the elastic properties of the material, which allows an elastic expansion of the cup B as a consequence of the disengagement of the thread C from the corresponding grooves of the portion 9, whereas the retention ring E opens slightly so as to slide on the cylindrical wall of the portion 9. It should be noted that initially the cap, due to the friction with which it adheres to the plunger, drags the plunger downward by a short extent and causes the spacing of the chamfer 32 from the collar 33. This spacing allows the retention ring E to flex outward, facilitating the extraction of the cap from the plunger. When the cap has been extracted from the plunger, due to the elastic "memory" of the plastics the ring E regains its conical shape that tapers towards the axis of the cap.

Meanwhile, the carousel has turned into a position in which the removed cap A drops onto a removal chute (not shown) that is interposed between the two half-molds 1 and 2. The described cycle is repeated, during one rotation of the carousel, for each one of the molding units.

In practice, by providing a carousel with thirty-two molding units, the cap cooling step covers approximately 315°, whereas the operations for inserting the dose of plastics in the cavity of the bowl 59, cap molding, and cap extraction are performed over the remaining 45°.

When the caps A exit from the apparatus, they are subjected to subsequent treatments. In particular, for the particular type of capsule A shown, the score line F is formed and the ring E is overturned inward so that said ring E can act edgeways on the collar of the container to which the cap has been applied and withstand traction during unscrewing until the band D breaks along the score line F.

A substantial advantage of the described apparatus is the fact that during molding the pressure on the plungers 3, 9 is discharged onto the drum 35 by means of the spacer ring 33c and the elements 30, 31, and 41. Accordingly, the rod members constituted by the sleeve 5 and by the tubular stem 6 do not have to withstand high axial loads and can be made smaller than the equivalent elements of conventional devices, in which compression is achieved by actuating the plungers with respect to a stationary bowl 59 by means of an actuation cam that is concentric to the rotation axis of the carousel. In conventional devices, the equivalent rod members in fact must withstand not only the considerable molding pressure but also the lateral stresses that arise from the tangential components that are caused by the engagement of the rod members on the profile of the actuation cam. The rod members of the described apparatus, that is to say, the sleeve 5 and the tubular stem 6, can therefore be lighter and constructively simpler due to the absence of elements that are forced to follow the actuation cam. This leads to easier assembly and simplifies the operations for replacing the molds when it is necessary to produce closures having another shape and a different tamper-proof ring.

Another substantial advantage is constituted by the fact that the spacing of the conical surfaces 32 and 33 occurs automatically during the expulsion of the closure and is not actuated by cam means.

FIG. 8 is a view of an embodiment of a cap in which the retention elements are constituted by a plurality of flaps H that are molded so as to form an acute angle with the internal wall of the cup. To produce such a cap, it is sufficient to provide, instead of the collar 33 that has a conical surface, a groove 70 that has a V-shaped cross-section with a conical internal surface that flares upward and, at the lower end of the jacket 30, an edge with a conical outer surface 71 that tapers downward at an angle that is identical to the angle of the groove 70, so as to mate exactly with it. Recesses 72 are formed in the conical outer surface of the edge 71 to form the flaps H during molding. The method of operation of the apparatus is the same, with the difference that during the closure of the mold the edge 47 of the ring 46 can descend below the upper edge of the portion 9 by an extent thereof that is defined by an internal step 73 that forms the edge of the cap during the molding of said cap. When the sleeve 43 is actuated downward, the step 73, by engaging against the edge of the cap, can extract said cap from the portion 9, while the cap remains attached to the ring 43 by means of the ring D. The subsequent upward motion of the sleeve 43 causes, by contrast against the pan 3 of the plunger, the folding of the flaps H towards the inside of the cap and the final expulsion thereof.

In a further embodiment of the apparatus, shown in FIG. 10, the internal shoulder of the bowl 59, instead of having a flat step, can have a spherical shape 74 that is adapted to avoid the stagnation thereon of any fragments of plastics during dosage. Of course, in this case the lower end of the ring 46 also has a spherical shape 75 that is complementary to the shape of the shoulder 74.

Figure 11:
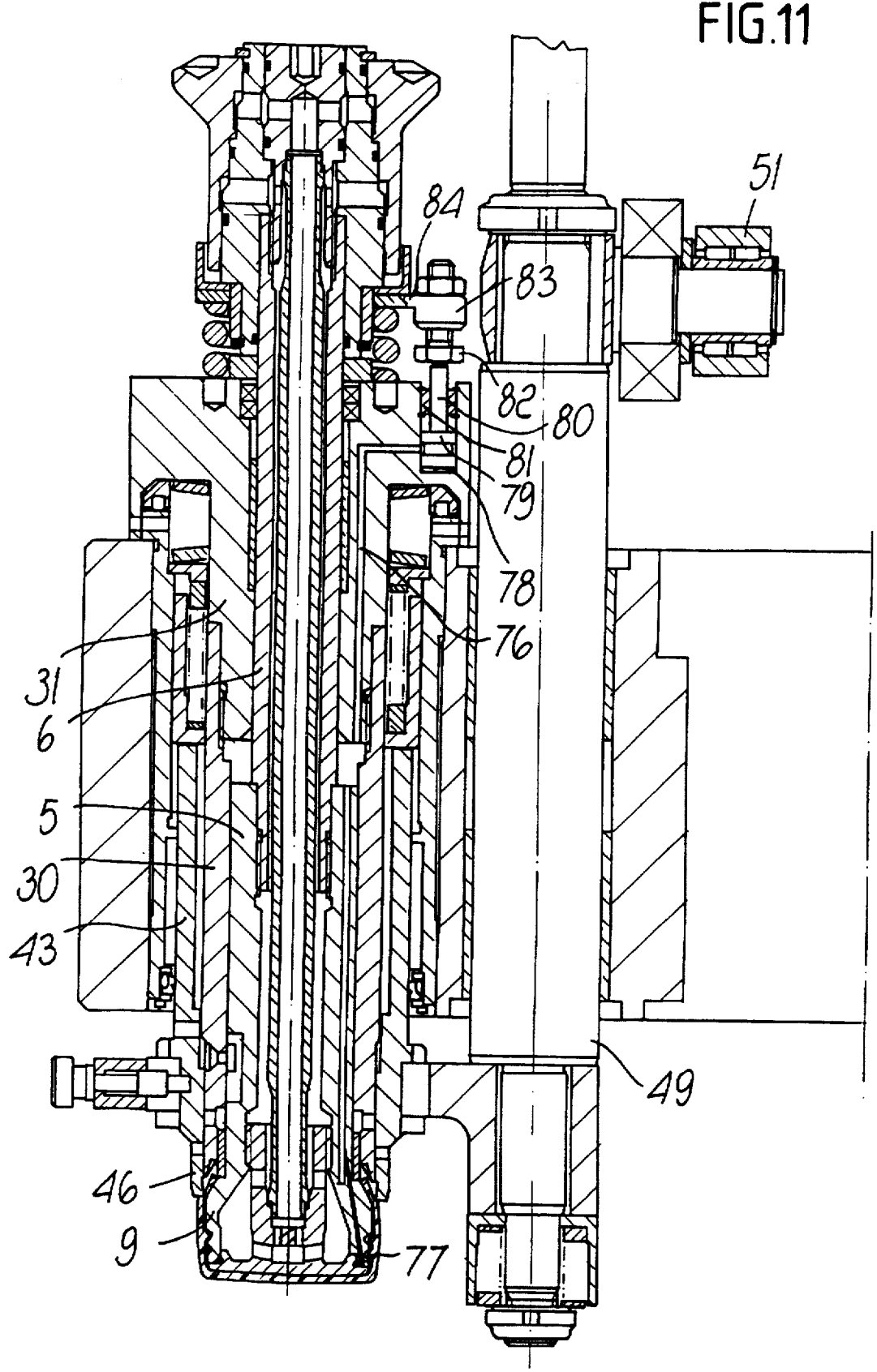
FIG. 11 is a view of still another embodiment, related to the means for expelling the molded closure.

Another embodiment of the apparatus, shown in FIG. 11, uses compressed air, controlled by a valve, to facilitate the extraction of the caps from the plunger 3, 9. For this purpose, there is a channel 76 that runs axially in the wall of the end portion 9, of the jacket 30, and of the tubular element 31 and leads outside at the bottom through an outlet 77 that is constituted by a space formed between the lower edge of the portion 9 and the pan 3. In an upward region, the channel 76 leads into a hole 78 that is connected to a source of compressed air. A piston 79 can slide in the hole 78, and a pin 80 acts on said piston; said pin is guided in a bush 81 that is fixed in the hole 78. A screw 82 can act on the pin 80 and is screwed into an arm 83 that protrudes from a swivel ring 84 that is retained between the spring 67 and the ring 68. The piston 79 acts as a shutter that opens and closes the compressed-air delivery toward the outlet 77 in step with the cycle of the apparatus, so as to send compressed air inside the cap as soon as the lower half-mold has moved away from the plunger 3, 9. The feeding of compressed air inflates the cap and partially spaces the thread C from the portion 9, reducing the resistance of the cap to expulsion during the subsequent descent of the ring 46.

The invention thus conceived is susceptible of numerous modifications and variations, all of which are within the scope of the inventive concept.

All the details may furthermore be replaced with other technically equivalent ones.

In practice, the materials employed, as well as the shapes and the dimensions, may be any according to the requirements without thereby abandoning the scope of the protection of the claims that follow.

I claim:

1. An apparatus for manufacturing screw closures having tamper-proof rings provided with retention elements adapted to engage below a collar of a container to be closed comprising:

a carousel supporting structure that is rotatable about a vertical rotation axis thereof;

a plurality of pressure molding units including each an upper male half-mold and a lower female half-mold, said male and female half-molds being aligned along a vertical alignment axis that is parallel to said rotation axis of the carousel to form a molding chamber and to further provide a molding pressure in said molding chamber by lifting and respectively forcing the lower female half-mold against the upper male half-mold which is maintained in a stationary position;

a bowl provided at said female half-mold and forming a cavity which has an annular shoulder;

a cylindrical jacket provided at said male half-mold, said jacket being fixedly supported at the carousel structure coaxially to said vertical alignment axis;

a sleeve, which is guided on said jacket and has a lower annular segment that is adapted to engage said bowl;

a plunger, which is guided in said jacket;

return elastic means for urging said plunger in a raised molding position;

hydraulic actuation means for actuating said female half-mold from a lowered position for receiving a dose of plastic material that is sufficient to form a closure, to a raised molding position in which said annular segment of said sleeve enters said bowl to abut against said annular shoulder and to form, together with the plunger, the closure molding chamber in which said closure is molded on said plunger, and again to said lowered position so as to allow removal of said molded closure from said plunger;

mutually opposite surfaces provided at said plunger and respectively at said jacket to form, in said molding position of the female half-mold, a male half-mold cavity in which the retention element of said tamper-proof ring is molded;

sleeve actuation means for actuating said sleeve in a downward motion so as to act axially on the molded closure and drag downwards the plunger by a short extent for causing a spacing of said opposite surfaces enough for freeing the molded retention element and remove the molded closure.

2. Apparatus according to claim 1, wherein said plunger comprises a vertical sleeve that is guided in said cylindrical jacket, said vertical sleeve having an end portion whose outside diameter is greater than that of the vertical sleeve so as to form a collar that is axially opposite to the end of said jacket.

3. Apparatus according to claim 1, wherein said opposite surfaces are conical.

4. Apparatus according to claim 1, wherein said annular segment has an end with an internal edge which forms an edge portion of the closure when said lower half-mold is in the raised molding position.

5. Apparatus according to claim 1, wherein said annular segment has an internal step that forms an edge portion of the closure in the raised moldings position of said lower half-mold.

6. Apparatus according to claim 1, wherein said shoulder of said bowl and a lower end of said annular segment have mating and rounded abutment surfaces.

7. Apparatus according to claim 1, wherein said bowl is provided with a disk, an external ring and a hydraulically actuated stem, the bowl being locked through said external ring against the disk to form a chamber for cooling liquid, said disk being mounted at the end of said stem.

8. Apparatus according to claim 7, wherein a further chamber is formed in said plunger, said bowl chamber and said plunger further chamber being fed with cooling liquid.

9. Apparatus according to claim 1, further comprising an arm and a post, said sleeve being connected, through said arm, to said post which is guided in said carousel and is cam actuated.

10. Apparatus according to claim 1, further comprising a compressed air source and a channel, said channel having an inlet connected to said compressed air source and an outlet that leads outside of a lower end portion of said plunger, said channel including a valve for controlling feeding of compressed air inside said molded closure when the lower half-mold has moved away from said plunger to said lowered position.

11. In an apparatus for manufacturing screw closures having tamper-proof rings provided with retention elements adapted-to engage below a collar of a container to be closed and including a carousel supporting structure that is rotatable about a vertical rotation axis thereof, a plurality of pressure molding units including each an upper male half-mold and a lower female half-mold, said male and female half-molds being aligned along a vertical alignment axis that is parallel to said rotation axis of the carousel to form a molding chamber and to further provide a molding pressure in said molding chamber by lifting and respectively forcing the lower female half-mold against the upper male half-mold which is maintained in a stationary position, and wherein each said molding unit further comprises:

a bowl provided at said female half-mold and forming a cavity which has an annular shoulder;

a cylindrical jacket provided at said male half-mold, said jacket being fixedly supported at the carousel structure coaxially to said vertical alignment axis;

a sleeve, which is guided on said jacket and has a lower annular segment that is adapted to engage said bowl;

a plunger, which is guided in said jacket;

return elastic means for urging said plunger in a raised molding position;

hydraulic actuation means for actuating said female half-mold from a lowered position for receiving a dose of plastic material that is sufficient to form a closure, to a raised molding position in which said annular segment of said sleeve enters said bowl to abut against said annular shoulder and to form, together with the plunger, the closure molding chamber in which said closure is molded on said plunger, and again to said lowered position so as to allow removal of said molded closure from said plunger;

mutually opposite surfaces provided at said plunger and respectively at said jacket to form, in said molding position of the female half-mold, a male half-mold cavity in which the retention element of said tamper-proof ring is molded;

sleeve actuation means for actuating said sleeve in a downward motion so as to act axially on the molded closure and drag downwards the plunger by a short extent for causing a spacing of said opposite surfaces enough for freeing the molded retention element and remove the molded closure.

12. The molding unit of claim 11, further comprising elastic abutment means mounted so as to contrast upward movement of said sleeve upon actuation of said female half-mold in said raised molding position.

13. In an apparatus for manufacturing screw closures having tamper-proof rings provided with retention elements adapted to engage below a collar of a container to be closed and including a carousel supporting structure that is rotatable about a vertical rotation axis thereof, a plurality of pressure molding units including each an upper male half-mold and a lower female half-mold, said male and female half-molds being aligned along a vertical alignment axis that is parallel to said rotation axis of the carousel to form a molding chamber and to further provide a molding pressure in said molding chamber by lifting and respectively forcing the lower female half-mold against the upper male half-mold which is maintained in a stationary position, and wherein each said molding unit further comprises:

a bowl provided at said female half-mold and forming a cavity which has an annular shoulder;

a cylindrical jacket provided at said male half-mold, said jacket being fixedly supported at the carousel structure coaxially to said vertical alignment axis;

a sleeve, which is guided on said jacket and has a lower annular segment that is adapted to engage said bowl;

a plunger, which is guided in said jacket;

return elastic means for urging said plunger in a raised molding position;

hydraulic actuation means for actuating said female half-mold from a lowered position for receiving a dose of plastic material that is sufficient to form a closure, to a raised molding position in which said annular segment of said sleeve enters said bowl to abut against said annular shoulder and to form, together with the plunger, the closure molding chamber in which said closure is molded on said plunger, and again to said lowered position so as to allow removal of said molded closure from said plunger; mutually opposite surfaces provided at said plunger and respectively at said jacket to form, in said molding position of the female half-mold, a male half-mold cavity in which the retention element of said tamper-proof ring is molded;

a spacer provided between a portion of said plunger and a shoulder of said jacket so as to form with said opposite surface, during molding, said male half-mold cavity and to allow the molding pressure to be discharged through said plunger and said jacket onto said carousel structure;

sleeve actuation means for actuating said sleeve in a downward motion so as to act axially on the molded closure and drag downwards the plunger by a short extent for causing a spacing of said opposite surfaces enough for freeing the molded retention element and remove the molded closure.

\* \* \* \* \*